April 8, 1941.    G. D. STEWART    2,237,692
TOOL SPINDLE
Filed April 12, 1937    2 Sheets-Sheet 1
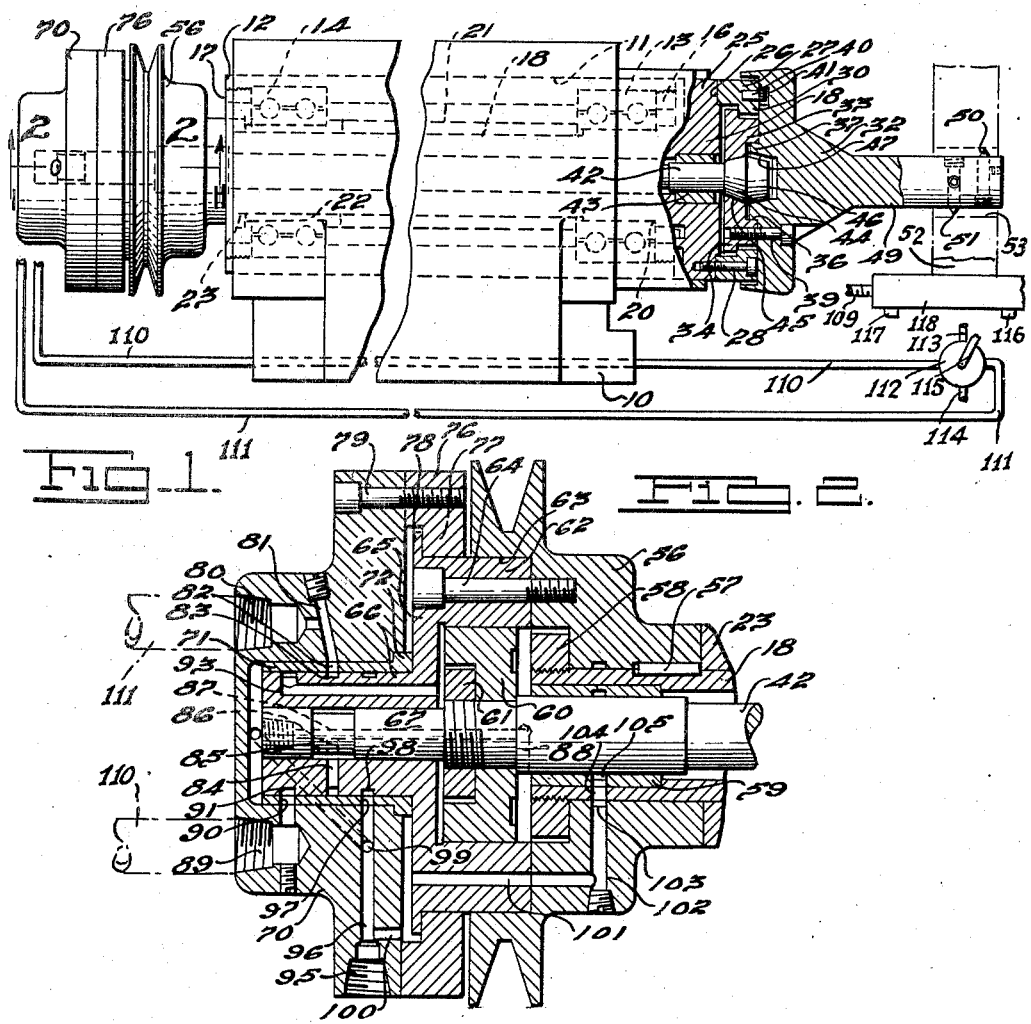
INVENTOR
Gilbert D. Stewart.
BY
Harness, Dickey & Pierce.
ATTORNEYS.

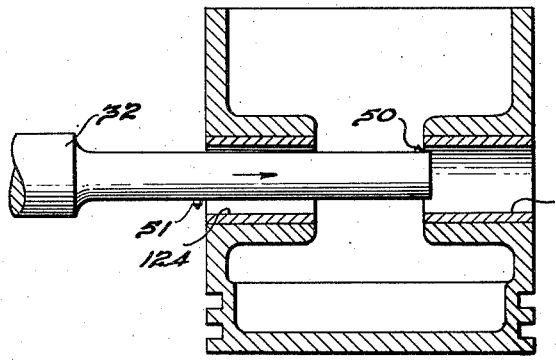
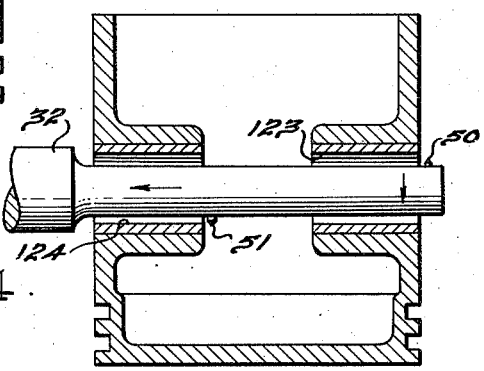
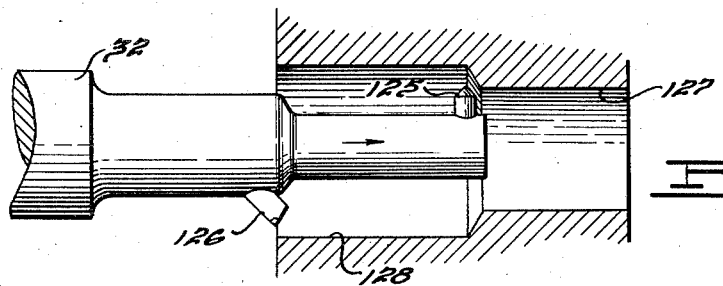
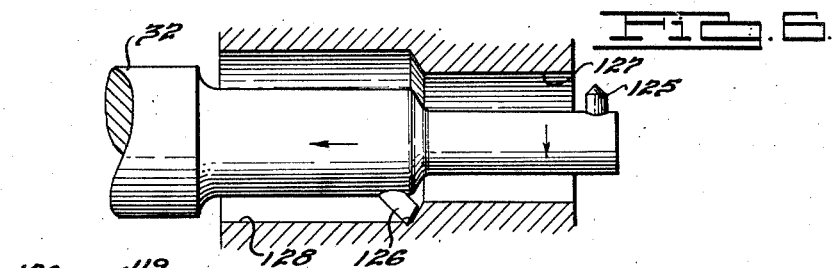
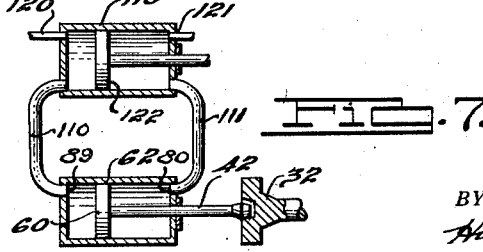

Patented Apr. 8, 1941

2,237,692

UNITED STATES PATENT OFFICE 2,237,692

TOOL SPINDLE

Gilbert D. Stewart, Detroit, Mich., assignor to Ex-Cell-O Corporation, a corporation of Michigan Application April 12, 1937, Serial No. 136,301

7 Claims. (Cl. 77—3)

This invention relates to boring machines and it has particular relation to a spindle unit for the boring machine.

The use of boring machines for taking rough and finish cuts from metal surfaces defining bearing openings is well known. As an example, such machines are used to take finish cuts in wrist pin openings of pistons and it will be appreciated that precise boring of the opening in a case of this kind is required. In the use of a machine for this purpose, the spindle of the machine is provided with a boring tool and the spindle and tool rotate as axial movement thereof with respect to the work occurs. After the cut is completed, the work is axially withdrawn and in many instances, this axial movement results in scoring of the surface previously cut. Manifestly this scoring is undesirable especially after a finish and precision cut has been taken.

One object of the present invention is to provide an improved, efficient, and dependable mechanism for radially retracting the tool from the work surface after a cut has been taken so as to avoid the aforementioned scoring during axial withdrawal of the work.

Another object of the invention is to provide a mechanism of the above designated character wherein radial retraction of the tool for the purpose mentioned is effected automatically and quickly so as to insure retraction of the tool at the instant desired.

Another object of the invention is to provide a mechanism of this character wherein retraction of the tool is accomplished by hydraulically operated means.

Another object of the invention is to provide, in a mechanism of the type designated previously, improved means for positively locking the tool against radial movement except when such radial movement is required or desired.

Another object of the invention is to provide boring mechanism wherein a plurality of tools are used and wherein upon retracting one tool from its cutting engagement, another tool may be radially moved into a cutting position, so that, for example, a part of the bore may be cut with one tool as the work is moved axially in one direction and upon radial retraction of the first tool, that a second tool may be moved into cutting engagement with another part of the bore for the purpose of cutting the latter during axial movement of the work in the opposite direction.

Other objects of the invention will become apparent from the following description, the drawings relating thereto and from the claims hereinafter set forth.

Reference may now be had to the accompanying drawings wherein:

Figure 1 is an elevational view, partly in cross section, showing a spindle unit and operating arrangement for a boring machine embodying one form of the invention;

Fig. 2 is a cross-sectional view on a larger scale taken substantially along the line 2—2 of Fig. 1;

Figs. 3, 4, 5 and 6 illustrate applications of the invention to special uses;

Fig. 7 is a schematic view illustrating another means for automatically and hydraulically controlling the tool retraction and radial movement that may be effected in conjunction with the form of the invention shown by Figs. 1 and 2.

In connection with the drawings, it may be mentioned initially that the base of the boring machine for supporting the spindle unit illustrated is not shown. It will be understood that each spindle unit is rigidly mounted on the machine base or on a bridge on the base and that the work to be operated upon is mounted upon a reciprocable table. After the work is centered with respect to the spindle axis, the spindle is driven and then during axial movement of the work the tool performs its cutting operation. The patent to Alden 2,000,553 discloses a machine upon which the herein disclosed spindle units may be mounted as will readily be understood in considering the patent.

Referring to Fig. 1, the spindle unit includes a spindle bracket 10 adapted to be mounted on the machine base, and this bracket is longitudinally bored, as indicated at 11, for receiving a spindle body 12 that is fastened therein. This body is of tubular character and adjacent the ends thereof, anti-friction ball bearings 13 and 14 are provided. Threaded collars 16 and 17 retain the outer races of these bearings in position.

The inner races of the bearings are carried by a spindle 18 rotatable in the spindle body and which projects beyond opposite ends of the latter. The inner race of the bearing 13 is held against an external shoulder 20 on the spindle by a spacer sleeve 21 extending between the bearings, and the inner race of the bearing 14 is mounted on a smaller sleeve 22 held against the end of the spacer by a collar 23 that in turn is held in position on the spindle by a pulley hereinafter to be described.

From the foregoing description, it will be apparent that the spindle is rotatably mounted in the spindle body carried by the bracket 10 and that the collar 23 and shoulder 20 on the spindle position the latter axially in the spindle body.

The spindle 18 at its right end is enlarged to provide a flange 25 and the right end face of this flange adjacent its outer edge is recessed, as indicated at 26, to provide an annular seat for a retaining ring 27 which is secured to the flange by means of circumferentially spaced screws 28. This retaining ring adjacent its outer end face is provided with an annular internal shoulder 30. A quill 32 is disposed for radial sliding movement on the end face of the retaining ring 27 and for locating and holding the quill in axial position, a locating ring 33 is provided between the quill and the flange 25 and this ring has an external annular shoulder 34 slidably engaging the inner radial face of the shoulder 30 on the retainer ring 27. The quill is centered with respect to the locating ring 33 by means of an annular recess 36 in the latter which snugly receives a projecting portion 37 on the inner face of the quill, and the quill and locating ring are fastened together by means of circumferentially spaced screws 39. For drivingly connecting the retainer ring 27 to the quill 32, a key 40 fastened to the retaining ring projects into a radial key way 41 in the face of the quill and this key way is of sufficient radial length to permit the necessary and relative radial movement of the quill with respect to the retaining ring.

The quill and locating ring are adapted to be shifted radially and to be locked in two different positions by the following means and in the following manner. A rod 42 extends axially through the spindle and is guided in the closely fitted bore of bushing 43 therein, and has an inner conical portion 44 adjacent its end adapted to seat in and fit a conical recess 45 in the locating ring 33. An outer conical portion 46 on the end of the rod projects into a conical recess 47 in the end face of the quill, but the axis of this recess is radially spaced a slight distance from the axis of the recess 45. It will be noted that the recess 47 is of such character that with the inner conical portion 45 on the rod seated snugly in the recess 45 in the locating ring, the outer conical portion 46 on the rod engages one side only of the conical recess 47. Now if the rod is pushed to the right from the position shown, movement of the quill and locating plate in a downward direction occurs, as seen in Fig. 1, and final movement of the rod to the right to its limit, as permitted by the recess 47, causes the outer conical portion 46 to seat snugly in the recess 47.

Movement of rod 42 in one direction or the other therefore will shift the axis of the quill and locating ring radially from one position to another. As illustrated, the axis may coincide with the spindle axis in one position of the rod, and be spaced radially therefrom when the rod is shifted, but it is manifest that the quill and ring axis may be spaced radially from the spindle axis in both positions of the rod. The better balancing conditions are obtained with the axis of the quill and ring moving from the spindle axis to positions at opposite sides thereof but spaced equally therefrom, when the rod is shifted from one position to the other.

It may be noted here that the upper side of the conical portion 44 and the lower side of conical portion 46 will substantially maintain contact with the upper side of recess 45 and the lower side of recess 47 during shifting of the rod 42 and consequently the quill will not be loose on the rod at any time during shifting. It is to be understood, however, that one or the other of the conical portions becomes snugly and positively seated in its recess at the limit of rod movement so as to positively lock the rod in either radial position.

The outer end of the quill is cylindrical, as indicated at 49, and is shown as carrying a plurality of boring tools 50 and 51 disposed on diametrically opposed sides and in the plane of radial movement of the quill axis. The work is indicated at 52 and an opening therein at 53, and with the parts in the position shown, it is apparent that the tool 50 may be used for taking a rough cut in the opening when the work is moving to the left and that after the tool 50 passes beyond the right end of the opening, the rod 42 may be moved to the right so as to retract the tool from the surface and to dispose the tool 51 in position for taking a finish cut on the return stroke of the work.

The foregoing description describes the manner in which the boring operations may be performed and the tools moved radially from one position to the other. The means for rotating the spindle and the means for moving the rod 42 will now be described in connection with Fig. 2, which illustrates in greater detail the left hand end of the spindle unit.

As shown by Fig. 2, the spindle 18 has a pulley 56 keyed thereon, as indicated at 57, and the pulley is held on the spindle by means of a nut 58 threaded on the latter and which holds the pulley against the previously mentioned collar 23. It will be understood that the pulley is driven by means of a belt extending from a motor on the boring machine. Reference now will be had to the means for reciprocating the rod 42.

The rod 42 extends through a bushing 59 fitted in the left end of the spindle 18 and beyond the end of the spindle a piston 60 is fastened on the rod by means of a nut 61 which holds the piston against a shoulder on the rod. The piston is reciprocatory in a cylinder 62 which projects into a recess 63 in the pulley and the cylinder is secured to the pulley by means of circumferentially spaced screws 64. At the left of the piston, the cylinder has an end flange 65 and a tubular projection 66 which snugly but reciprocably receive an end portion 67 of the rod 42 which projects beyond the piston 60.

It will be appreciated that the construction so far described with respect to Fig. 2 provides a piston and cylinder by means of which the rod 42 may be reciprocated depending upon the application of fluid pressure to one side or the other of the piston, and that the assembly, including the spindle, is driven by the pulley 56.

In order to apply, exhaust, and otherwise control the fluid pressure in this arrangement, a stationary head 70 is provided which is generally of cup-shape with the cup portion receiving the tubular portion 66 on the cylinder 62. A bushing 71 is fitted within the cup-shape portion of the head 70 and snugly but rotatably receives the tubular portion 66 of the cylinder, and this bushing at its inner end has an enlargement 72 which projects beyond the right face of the head and slidably engages the end flange 65 on the cylinder. This engagement separates the faces of the cylinder and the head 70 and the parts are held in this relation by a retaining ring 76, which has an inwardly directed annular flange 77 radially overlapping an outwardly directed flange 78 on the cylinder. This retaining ring is secured to the head 70 by means of circumferentially spaced screws 79. It will be understood that the bushing 71 and the flanges 77 and 78 hold the cylinder and head in a running fit relation without involving undesirable friction.

Fluid under pressure is applied to and exhausted from the right side of the piston 60 through an inlet 80 in head 70, adapted to be connected to a fluid pressure line, a passage 81, an opening 82 in the bushing 71, an annular groove 83 in the outer surface of the tubular portion 66 of the cylinder, and a radial opening 84 extending from the groove to the interior of the tubular portion. The latter opening communicates with an annular recess 85 on rod portion 67, and this space in turn communicates with a radial opening 86 in the rod, which in turn communicates with longitudinally extending passage 87 extending through the rod to a point beyond the right side of the piston 60. Here the passage 87 communicates with a radial passage 88, in turn communicating with the space at the right side of the piston.

Fluid is applied to and exhausted from the left side of the piston by means of a connection 89 communicating with an opening 90 in the bushing 71, and which in turn communicates with an annular groove 91 in the tubular portion 66. The groove 91 in turn communicates with a longitudinally extending passage 93 in the tubular portion 66 which extends to the left side of the piston. It will be understood that when fluid under pressure is applied to one side of the piston through the connections therefor it will be exhausted from the other side of the piston through the connections for this side and vice versa.

In an arrangement of this kind of course it is desirable to take care of fluid leakage and also prevent the leakage of fluid to spaces where an undesired fluid pressure might be built up. These results are accomplished as follows: A drain connection 95 in the head 70 communicates with a passage 96 which in turn communicates with an opening 97 in the bushing 71 disposed to the right of the opening 82 and groove 83 in the bushing 71 and tubular portion 66, respectively, and the opening 97 in turn communicates with an annular groove 98 in the outer surface of such tubular portion. Thus any leakage of fluid along the surface of the bushing at this point will be taken care of. Passage 96 also communicates with a passage 99 extending to the space between the end wall on the head 70 and the end of the tubular portion 66, and this arrangement will prevent the building up of any fluid pressure beyond the left end of the rod 42 and tubular end 66. Passage 96 also communicates with a passage 100 communicating with the space between the end flange 65 on the cylinder and the head 70, and this space communicates with another passage 101 extending axially through the cylinder wall and through a portion of the pulley.

The passage 101 communicates with a radial passage 102 in the pulley which in turn communicates with an annular groove 103 in the internal surface of the pulley and this groove in turn communicates with a radial opening 104 in the spindle 18 and bushing 59 which in turn communicates with an annular groove 105 in the internal surface of the bushing 59. It might be noted here that the drilled passage 102 in the pulley, 87 in rod portion 67 and those leading to the housing 71 from the fluid line connections 80 and 89 have their outer ends plugged for manifest reasons.

It should be apparent from this description that leakage of fluid is taken care of at desirable points and that undesirable building up of fluid pressure at any point is avoided.

It will be noted that movement of the piston 60 can never be sufficient to disconnect the passage 84 and annular recess 85. Furthermore, the piston in either its left or right position will be spaced from the end walls of the cylinder owing to the fact that the conical end portions of the rod 42, as seen in Fig. 1, will seat in one or the other of the conical recesses before the piston can reach the end wall of the cylinder. This will insure positive seating of the conical ends of the rods in the conical recesses respectively.

Automatic operation of the piston 60, depending upon movement of the work, may be accomplished as schematically shown in Fig. 1. In this case, the cylinder 62 has its fluid connections 80 and 89 connected to fluid lines 110 and 111 leading to a conventional four way valve 112 having a fluid pressure line 113 connected thereto and an exhaust line 114. A handle 115 for turning the valve is adapted to be moved from one position to a reversing position by stops 116 and 117 on the work supporting table, which is indicated at 118. Such stops obviously could be adjustable as to position. Movement of the work support may be effected in one direction and then the other by different means known in the art, and a screw for effecting such movement is generally indicated at 109.

Fig. 7 illustrates another way in which automatic operation may be effected. In this case the lines 110 and 111, shown in Fig. 7, are connected to a second cylinder 119 which has its ends respectively connected to fluid lines 120 and 121. This cylinder includes a piston 122 adapted to do other work and it will be appreciated that a pressure differential at the sides of piston 122 will result in a similar differential at the sides of piston 60. This arrangement may be used in a hydraulically controlled system such as shown in Alden Patent No. 2,000,553, in which case the lines 120 and 121 would correspond to lines 54 and 55 in the patent respectively, or as desired.

As illustrative of further applications of the invention, reference may now be had to Figs. 3 and 4 wherein the machine is used to make a finish cut in the wrist pin openings of a piston. In this case, the openings in the walls of the piston are indicated at 123 and 124 and the cut in opening 123 is taken by the tool 50 and the cut in opening 124 is taken by the tool 51. Initially with the work in withdrawn position, the rod 42 (Fig. 1) will be shifted to the right by the hydraulic mechanism to push the quill downwardly, (refer to Fig. 3) so as to allow tool 50 to clear the side of the opening 124 and then the work is moved to the left to place it in approximately the axial position shown. Then the rod 42 is shifted in the other direction so as to move the quill upwardly and place the tool 50 in the cutting position as shown. This likewise moves the tool 51 out of cutting position and then the work is moved to the left while the tool 50 performs its cutting operation. When tool 50 has passed the right end of opening 123, tool 51 will likewise have passed the right end of opening 124 and then the rod 42 is shifted to cause the quill to move downwardly to place tool 50 out of cutting position and to place tool 51 in cutting position with respect to opening 124, as shown by Fig. 4. Then the work is moved to the right, during which time the tool 51 will perform its cutting operation in opening 124 and the tool 50 will move to the left without engaging the side of opening 123.

Figs. 5 and 6 show a slightly different form of quill having tools 125 and 126 for cutting a bore having different size portions 127 and 128. In this case, the tool 125 cuts the smaller bore portion indicated at 127 when the work is moved to the left, and then upon completion of this cut, the quill is moved downwardly, as shown by Fig. 6, to place the tool 126 in cutting relation to the larger portion 128 of the bore. This cutting operation is performed during movement of the work to the right during which tool 125 will be out of engagement with the bore 127.

Although more than one form of the invention has been illustrated and described, it will be apparent to those skilled in the art that various modifications thereof may be made without departing from the scope of the appended claims.

What is claimed is:

1. In combination, a rotary spindle, a cutting tool member adjustably carried by the spindle for adjustment transversely of the spindle axis, means including fluid pressure responsive means carried by and rotatable with the spindle for adjusting the tool, a stationary head having surface contact with a portion of the spindle, and means for supplying fluid to the fluid pressure responsive means including coinciding fluid conducting openings in the contacting surfaces.

2. In combination, a rotary spindle, a cutting tool member adjustably carried by the spindle for adjustment transversely of the spindle axis, a cylinder carried by one end of the spindle and having a larger bore and a smaller bore, a piston reciprocable in the larger bore, a rod connected to the piston and having a portion movable in the smaller bore, cooperating means on the rod and tool member for effecting adjustment of the tool member when the piston is moved, a stationary head having an opening in which the smaller bore portion of the cylinder is rotatably received in closely fitting relation, and means including passages in the head and smaller bore portion of the cylinder for conducting fluid to the larger bore.

3. In combination, a rotary spindle, a cutting tool member adjustably carried on one end of the spindle for adjustment transversely of the spindle axis, a cylinder on the opposite end of the spindle in axial alignment therewith, a piston in the cylinder, a rod connected to the piston and projecting from the inner end of the cylinder, cooperating means on the projecting end of the rod and on the tool member for adjusting the tool member, an extension on the outer end of the cylinder having an outer surface concentric to the spindle axis, a stationary head having an opening closely fitting said extension, and means including openings in said head and extension for conducting fluid to the cylinder.

4. In combination, a rotary spindle having spaced radial surfaces at one end, a tool holder having surfaces substantially fitting the first surfaces respectively and which is radially movable thereover, means locking the holder to the spindle for rotation therewith, a shank projecting from the holder in a direction generally axial of the spindle and beyond said end thereof and having a tool thereon, said holder having an opening at its center, the surface of which defines axially separated sections of cones having their larger diameters adjacent or axially next to each other and their axes directed generally along the spindle axis but offset radially one from the other, a member shiftable axially of the spindle and having an end portion projecting into said opening and provided with axially separated surfaces defining sections of cones, respectively, adapted to fit the first mentioned conical surfaces when the member is shifted axially, the arrangement being such that when the member is shifted axially in either direction, the holder is shifted into a positive location and forced into rigid engagement with one radial surface or the other depending on direction of shifting of the member, and fluid pressure means for maintaining said member and tool holder in either of the respectively shifted positions.

5. In combination, a rotary tool spindle of tubular character, means providing axially spaced, radial surfaces on one end of the spindle, a tool holder having a portion disposed between said surfaces in substantial contact therewith, said holder having axially arranged sockets defined by cone sections which have their larger diameters adjacent or axially next to each other and wherein one socket is eccentric to the other, a rod movable axially in the central opening of the spindle and having axially aligned conical portions having their larger diameters adjacent or axially next to each other, said conical portions on the rod being disposed in said sockets respectively and the arrangement being such that limited axial movement of the rod is permitted before one or the other of the conical portion on the rod seats in its socket depending on direction of movement of the rod, whereby the tool holder will be shifted radially as one or the other conical portion on the rod is moved into seating relation with its socket.

6. In combination, a rotary spindle, a boring tool holder on the spindle, means mounting the holder on the spindle for rotation therewith and for adjustment inwardly and outwardly with respect to the spindle axis, a pair of tools on the holder, each of which is in operative boring position when the other is in inoperative position, a work supporting table adapted to be moved relative to the spindle and along the axis thereof first in one direction and then in the opposite direction, means for holding the tool holder in one adjusted position so as to dispose one tool in its operative position during relative movement of the table and spindle in one axial direction, and means governed by relative axial movement of the spindle and table for shifting the tool holder so as to dispose the other tool in operative position during relative axial movement of the table and spindle in the other direction, the parts being so constructed and arranged that the tool holder may be shifted either when the tool is or is not rotating.

7. In combination, a rotary spindle, a cutting tool carried by the spindle, a support for carrying the work to be acted upon by the tool, means for relatively moving the spindle and support axially of the spindle, means for moving the tool outwardly and inwardly with respect to the spindle axis, means shiftable longitudinally of the spindle axis for effecting such movement of the tool, fluid pressure means carried by and rotatable with the spindle for shifting the last mentioned means, a stationary head having surface contact with a portion of the spindle, means for supplying fluid to the fluid pressure responsive means including coinciding fluid conducting openings in the contacting surfaces, and means controlled by relative axial movement of the support and spindle for controlling operation by the fluid pressure means.

GILBERT D. STEWART.

CERTIFICATE OF CORRECTION.

Patent No. 2,237,692. April 8, 1941.

GILBERT D. STEWART.

It is hereby certified that error appears in the printed specification of the above numbered patent requiring correction as follows: Page 3, first column, line 63, for "housing" read --bushing--; same page, second column, line 25, for "Fig. 7" read --Fig. 1--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.